United States Patent
Strand et al.

[11] Patent Number: 5,314,004
[45] Date of Patent: May 24, 1994

[54] THERMOSTAT FOR A VARIABLE CAPACITY HVAC AND METHOD FOR PROVIDING A RAMPING SET POINT ON A SETBACK THERMOSTAT

[75] Inventors: Rolf L. Strand, Crystal; Daniel T. Uhrich, Mayer, both of Minn.

[73] Assignee: Honeywell Inc., Minneapolis, Minn.

[21] Appl. No.: 68,867

[22] Filed: May 28, 1993

[51] Int. Cl.⁵ ............................................. F25B 29/00
[52] U.S. Cl. ............................................ 165/2; 165/12; 165/29
[58] Field of Search ................ 165/2, 12, 29; 236/46 R

[56] References Cited

U.S. PATENT DOCUMENTS

| | | | |
|---|---|---|---|
| 4,341,345 | 7/1982 | Hammer et al. | 236/46 R |
| 4,387,763 | 6/1983 | Benton | 165/29 |
| 4,674,027 | 6/1987 | Beckey | 364/143 |
| 4,702,305 | 10/1987 | Beckey et al. | 165/12 |
| 4,702,413 | 10/1987 | Beckey et al. | 236/46 R |
| 4,836,442 | 6/1989 | Beckey | 236/46 R |
| 5,029,449 | 7/1991 | Wilkinson | 165/29 X |
| 5,067,556 | 11/1991 | Fudono et al. | 165/29 |
| 5,148,979 | 9/1992 | Brueton | 236/94 |
| 5,193,143 | 3/1993 | Kaemmerer et al. | 395/51 |

Primary Examiner—William E. Tapolcai
Attorney, Agent, or Firm—Ian D. MacKinnon

[57] ABSTRACT

A thermostat for providing control signals to a variable capacity HVAC system. The thermostat being a setback thermostat with a ramping set point for the recovery period. The thermostat monitoring the load signal required during recovery and increasing or decreasing the ramp slope accordingly.

4 Claims, 4 Drawing Sheets

THERMOSTAT FOR A VARIABLE CAPACITY HVAC AND METHOD FOR PROVIDING A RAMPING SET POINT ON A SETBACK THERMOSTAT

FIELD OF THE INVENTION

The present invention pertains to a thermostat for the operation of a gas engine heat pump. More particularly, it pertains to a thermostat which provides pulse width modulation to allow for variable control of the gas engine heat pump.

BACKGROUND OF THE INVENTION

The standard thermostat operates by providing either an "on" signal or an "off" signal to the heating and cooling system, which causes the heating or cooling system to either run at full speed or be in an off state. Traditional HVAC equipment with compressors may have two speeds: minimum and maximum, giving the system limited variable capacity. The thermostats which control this equipment provide an on/off signal for each speed. Newer HVAC equipment may have variable speed compressors which are capable of a minimum "on" speed and are variable up to a maximum speed.

If the HVAC system which is utilized is a gas engine heat pump, the gas engine heat pump allows for several states. The gas engine heat pump can be off, on at an idle speed, or on at some greater value than idle, up to and including a maximum speed. Gas engine heat pumps are a recent development and are not currently available to the general public.

For a thermostat to operate with a gas engine heat pump, that thermostat is required to provide a signal which indicates the load (the percentage of the capacity of the HVAC equipment required to maintain the set point temperature). In this way, the gas engine heat pump is able to run at a higher speed as the load increases. As a result, a gas engine heat pump is better able to match the needs of the system.

The second condition which must be accounted for in a gas engine heat pump is the condition when setback thermostats are utilized. A setback thermostat will change the desired temperature at a set time to either increase or decrease the desired temperature with the intention of saving energy. For example, a standard setback thermostat, when operating in a northern climate in the winter, may increase the desired temperature in the morning when the occupants of the house are home. The thermostat will then decrease the desired temperature during the day when the occupants are away at work or school, and increase the temperature when the occupants return home. Finally, the thermostat will decrease the temperature when the occupants go to sleep. A gas engine heat pump operating in such an environment may be running at a high speed prior to the setback thermostat setting the temperature to a lower temperature, thus the signal from the thermostat would generally shut the gas engine heat pump off. Such a drastic change in speed will shorten the life of the gas engine heat pump. A second condition is where the thermostat would increase the desired temperature. In such condition, the gas engine heat pump would go from an off state to a maximum on state in a short period of time. Similarly, this would also shorten the life of the gas engine heat pump.

SUMMARY OF THE INVENTION

The invention is a thermostat which provides a pulse width modulation signal to a controller for a gas engine heat pump. The thermostat is a standard thermostat much like that disclosed in U.S. Pat. No. 4,314,665 and hereby incorporated by reference. However, the thermostat utilizes a microprocessor to formulate a pulse width modulation signal which the thermostat provides to the gas engine heat pump controller. The gas engine heat pump controller then regulates the speed at which the gas engine heat pump runs in order to provide the necessary output from the HVAC system.

The thermostats utilize a pulse width modulation signal with the width of the signal increasing based on the level of the load. As the load increases, the pulse width modulation signal increases the width of the pulse until a maximum load signal is reached. It has been noted that a gas engine heat pump will operate more efficiently at lower speeds.

To increase the life and efficiency of the engine, intermediate steps are provided which allow the engine to idle for a set period of time. In this manner, before the engine is run up to a maximum speed, the engine has warmed up. Further, before shutting the engine off, the system gradually decreases speed and idles the engine before being shut down. By avoiding quick changes in engine speed, the life of the engine is increased.

The system further incorporates a ramping set point which allows for the system to increase the desired and actual temperature at a slower rate of speed than by attempting to do it instantaneously. The object of the ramping set point is to incorporate a thermostat which can provide a control signal or load signal which allows for the operation at lower levels for a variable capacity HVAC system. Further, by utilizing ramping signals and idling for the gas engine heat pump, as discussed above, there will be an increase in the life and efficiency of the gas engine.

DESCRIPTION OF THE PREFERRED EMBODIMENT

Figure 1:
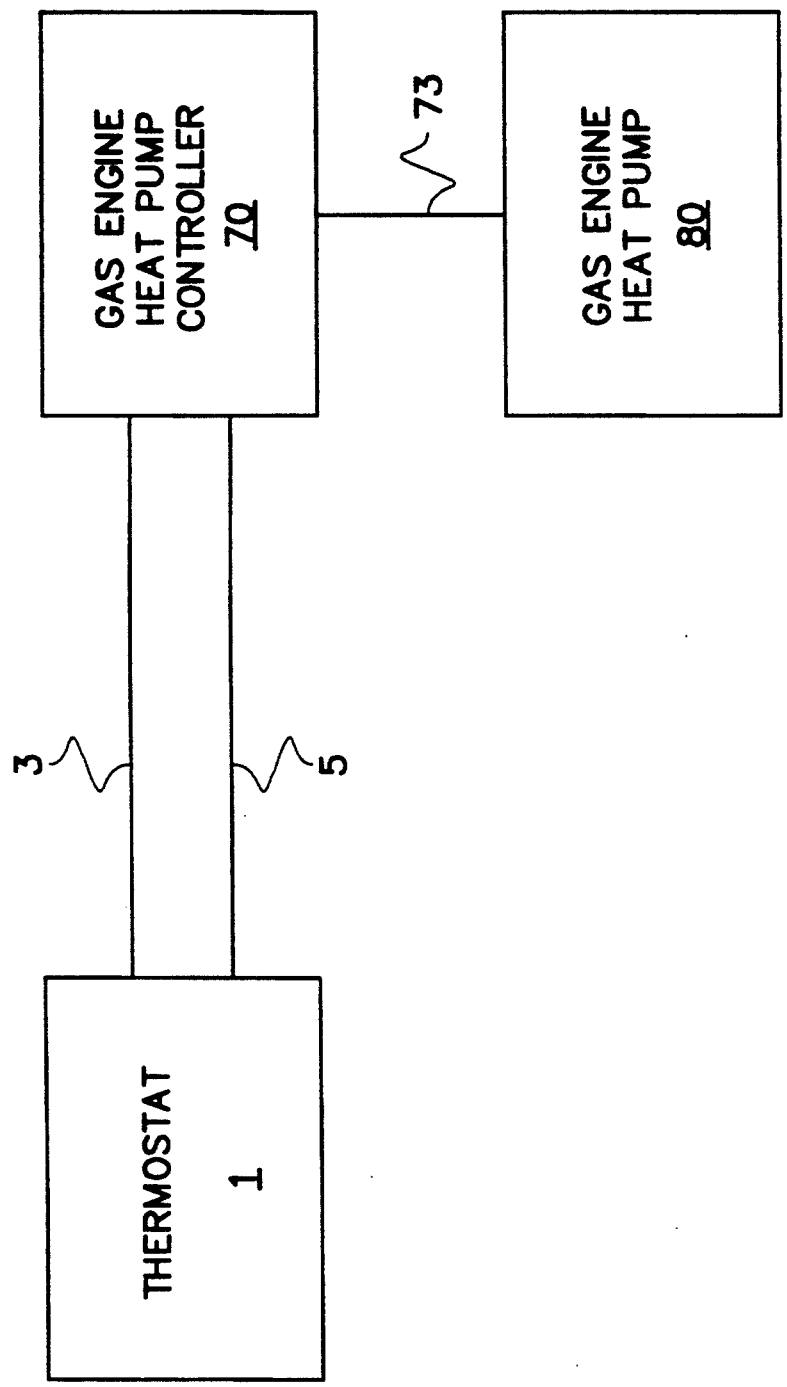
FIG. 1 illustrates a gas engine heat pump HVAC system.

An HVAC system, as illustrated in FIG. 1, incorporates thermostat 1, gas engine heat pump controller 70 and gas engine heat pump 80. Gas engine heat pump controller 70 provides a control signal to gas engine heat pump 80 through control line 73. Thermostat 1 provides a variable width pulse signal to gas engine heat pump controller 70 through control line 3 and further provides an on/off signal to gas engine heat pump controller 70 through control line 5.

Thermostat 1 is a standard electronic programmable thermostat which utilizes a microprocessor to calculate the error signal. The error signal is the difference between the desired temperature and the actual ambient room temperature.

Electronic programmable thermostats are well known in the art. Basic electronic programmable thermostats can be found in U.S. Pat. No. 4,314,665, issued to Mike Levine, and entitled "Electronic Thermostat." A second example of an electronic thermostat is U.S. Pat. No. 4,674,027 issued to Beckey and hereby incorporated by reference. Beckey teaches a programmable thermostat which utilizes a ramping scheme for the operation of its setback feature.

Gas engine heat pump 80 comprises a heat pump which is powered by a natural gas engine. The engine is capable of running at various speed by changing the throttle position, much as you would in a standard automobile engine. As gas engine heat pump 80 is capable of running at various speeds, it is now possible to run the HVAC system at varying output levels based on the heating level or cooling level required. To run the gas engine heat pump at varying levels requires that the gas engine heat pump know at what level it is required to work. Therefore, a gas engine heat pump controller 70 provides a control signal through control line 73. Gas engine heat pump controller receives signals from thermostat 1 and, based on those signals, is able to provide a control signal through control line 73.

Figure 2:
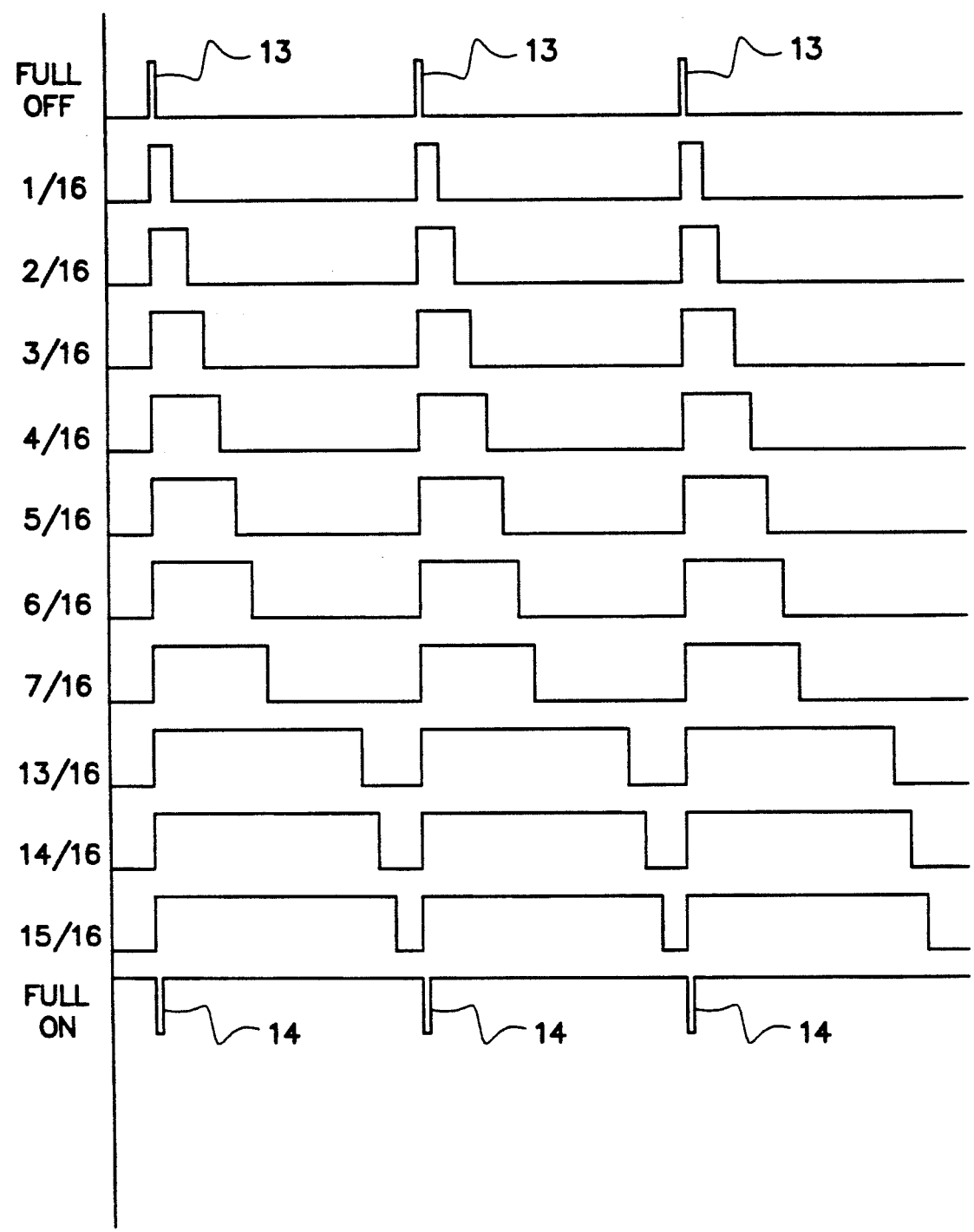
FIG. 2 illustrates the pulse width modulation signal for varying error signals.

In order for gas engine heat pump controller 70 to operate, it requires a signal from thermostat 1 which provides a signal which indicates the load required to maintain the set point temperature. Further, an "on/-off" signal is also necessary to allow the operator to turn heat pump 80 off when its use is no longer desired. An "on/off" signal is provided by thermostat 1 through control line 5 to gas engine heat pump controller 70. To allow gas engine heat pump controller 70 to know the level of the load, a variable width pulse signal is provided through control line 3 from thermostat 1 to gas engine heat pump controller 70. The pulse width modulation signal is a digital signal which is high for some fraction of a defined period. The period of time in which the digital signal is high relates to the level of the load signal. The pulse signals illustrated in FIG. 2 illustrate a system which has sixteen variable levels which may be provided to the gas engine heat pump controller 70. As illustrated in FIG. 2, when a full "off" command is provided by thermostat 70, marker pulse 13 is provided to allow the heat pump controller to know that a variable control thermostat is being utilized. Likewise, when a full "on" signal is provided, marker pulse 14 is also provided, which allows the system to know that this signal is from a variable control thermostat. Marker pulses 13 and 14 serve to provide a timing indication to the heat pump controller even when the signal is indicating full "on" or full "off". The controller also uses marker pulses 13 and 14 to determine open or shorted status on the line. By careful selection of pulse period and width duration, one can distinguish between a valid pulse width modulation signal and a 60 hz signal. This allows heat pump controller 70 to operate the equipment in a full on/full off mode when used with a standard non-modulating 24-volt ac thermostat.

Figure 5:
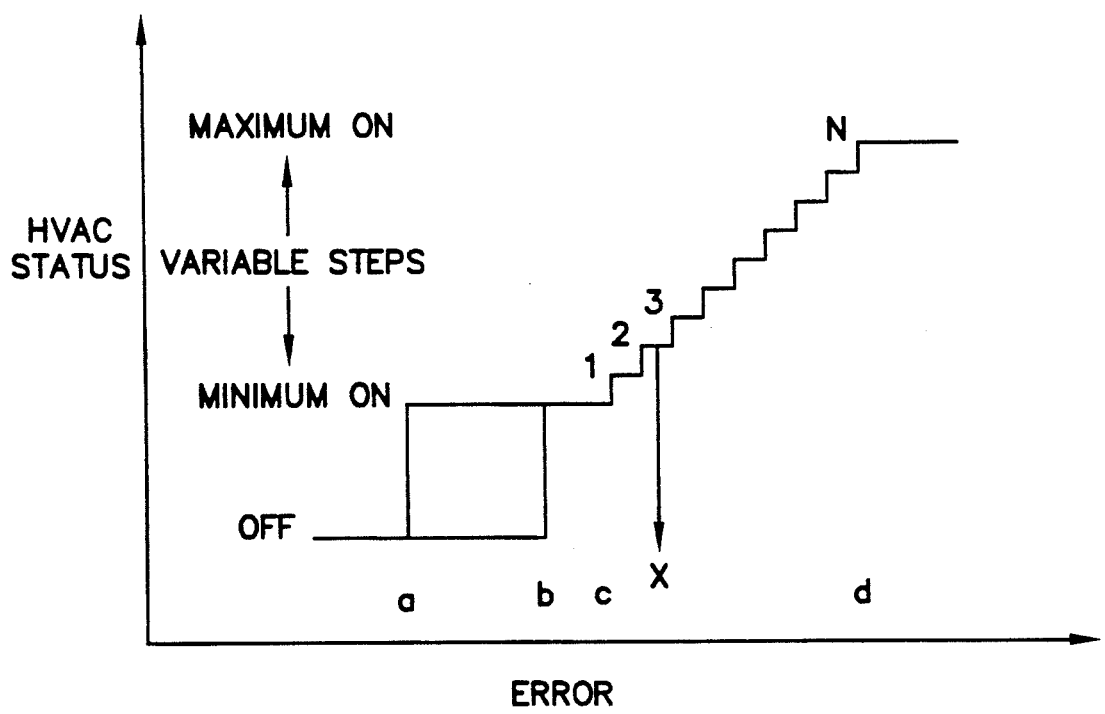
FIG. 5 illustrates the load signal versus HVAC status for a pulse width modulation.

The decision to turn the equipment "on" or "off" and the choice of pulse width are both made using an error calculation. Components of the error are current error, integrated error and anticipation. The current error is the difference between the set point and the ambient temperature at the current time. The integrated error is the accumulated current error. The anticipation is the non-linear duty cycle utilized with setback thermostats. Thermostat 70 calculates the pulse width modulation signal by looking at the error. As indicated in FIG. 5, the error may be of several levels. The system further uses hysteresis to prevent inadvertent "on/off" signals. As indicated in FIG. 5, if the error signal is less than a, the pulse is set to off and the equipment is turned off. If the error is greater than or equal to a, less than b and the system is off, the system pulse is set to off. If the error is greater than b and less than c, the pulse is set to minimum and the system is turned on. The minimum on pulse signal represents the idle speed. If the error is greater than c, the equipment is turned on. The pulse width is set utilizing the formula:

$$1+((error-c) \div ((d-c)/(n-1))).$$

For example, if N equals 8, then the size of error signal, for each variable step is $(d-c)/7$, where d equals 8 and c equals 1. Consider the case where error equals X, as illustrated in FIG. 5. X is approximately $2\frac{1}{2}$ of these error steps. Then the equipment is turned on and the pulse has a value of $1+1\frac{1}{2}$. The variable steps are discrete so the pulse value is truncated to 2. Now referring to FIG. 2, with a pulse value of 2, the pulse would appear as that illustrated with the 2/16th cycle.

Figure 3:
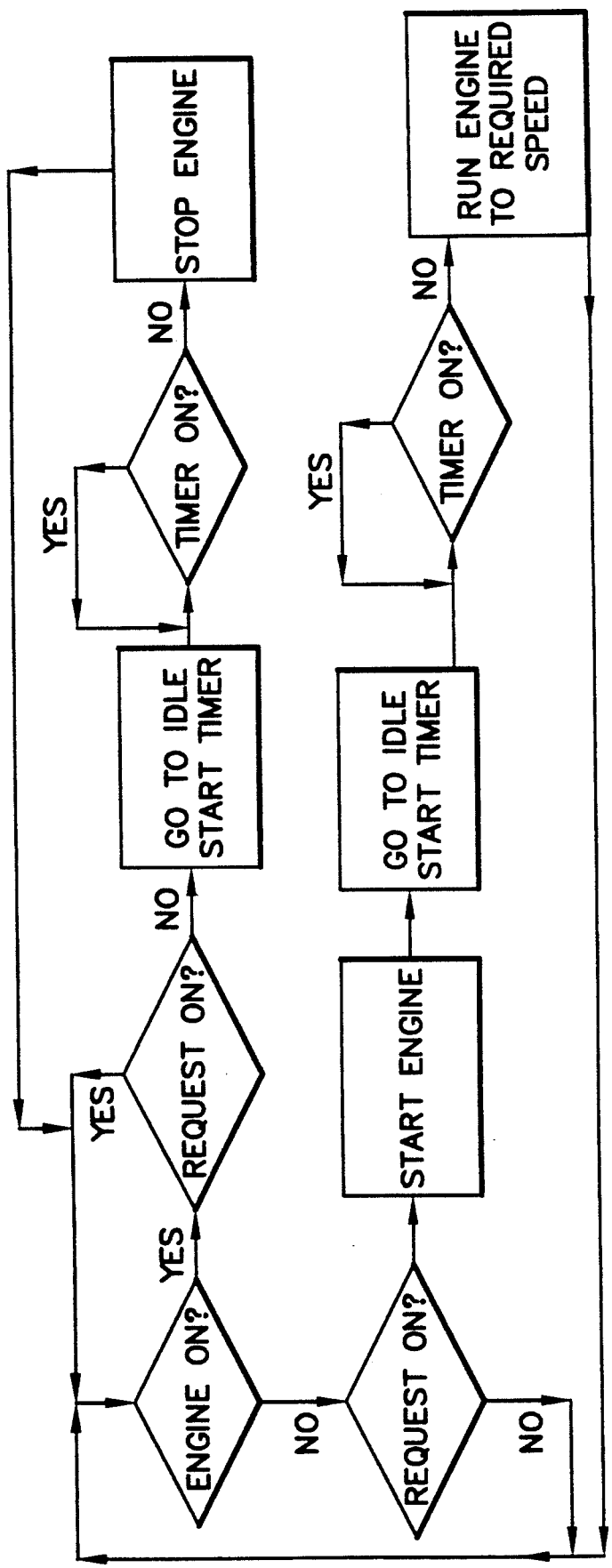
FIG. 3 illustrates a flow chart for the forced idle speed system.

As the system utilizes a gas engine to run the heat pump, the gas engine will operate better by idling the engine shortly after turning the engine on for a period of 30 seconds and by idling the engine for 30 seconds prior to turning the engine off. The flow chart illustrates in FIG. 3 is programmed into the microprocessor of thermostat 70 and provides for the necessary idle time. The system begins by determining if the engine is on. This is accomplished by looking at the current load signal being provided by thermostat 70. If the engine is "on", the system then determines whether there is a request for this system to run. If there is a request for the system to run, the system returns to validate that the engine is "on" and whether there is a request for heat or cooling. If the engine is "on" and no request is present, the system begins to step down to an idle speed, based on where the pulse width modulation is at that time. The system slowly steps down the engine speed until it reaches an idle state. At that time, the timer begins timing a 30-second period. At the end of the 30-second period, the engine is shut down. The system then begins the loop again by determining whether the engine is "on". With the engine "off", the system goes through a second loop, beginning by determining whether the engine is "on". If the engine is not on, it determines whether there is a request to turn the engine on. If no request is asked for, the system again determines if the engine is "on" is received, the engine then starts and goes to an idle speed and runs at the idle speed for a period of 30 seconds. The engine is then stepped up to the requested speed. The system then returns to the loop described earlier relative to when the engine is initially "on" by requiring engine 80 to be idled prior to full.

Figure 4:
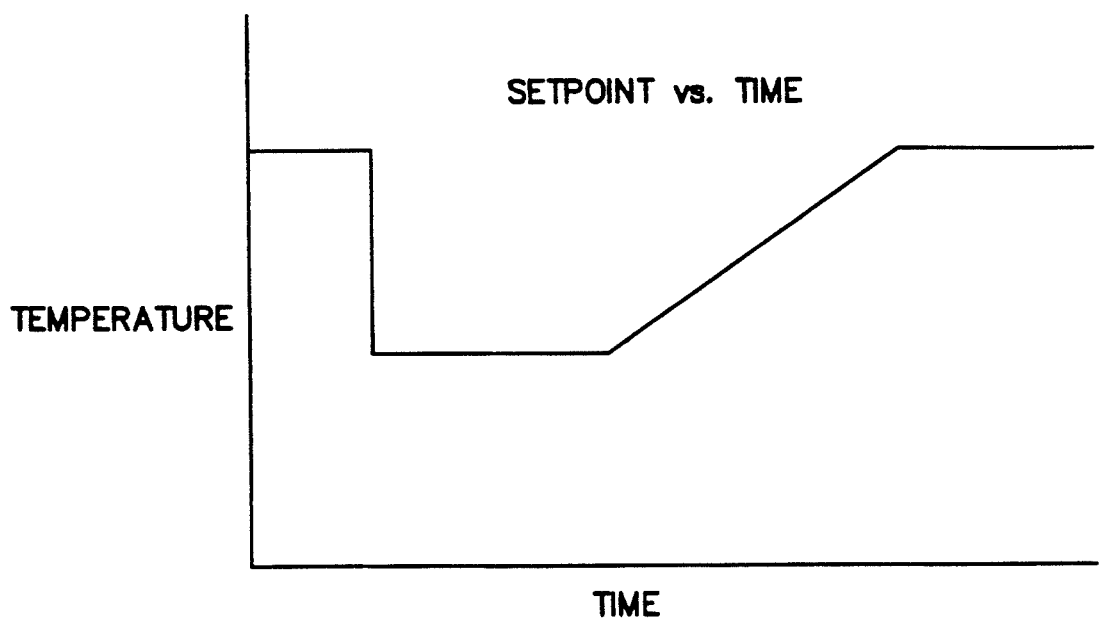
FIG. 4 illustrates set point versus time for a setback system.

FIG. 4 illustrates a standard set point versus time temperature ramp for a setback thermostat. The ramp illustrated in FIG. 4 is similar to the one illustrated in Beckey.

Setback thermostats may have the availability to start recovery from setback at a variable time, calculated from one or more factors, such as ramp rate. They may use several methods to adjust the controlling set point during the recovery, such as a step change or a ramp set point. At the end of the recovery, they may change the ramp rate to increase the efficiency or the comfort of the next recovery. With the addition of variable capacity HVAC equipment, it is possible to refine the recovery process to use a variable load signal as additional information in updating the ramp rate. Thermostat 70 ramps the set point and uses the normal steady state control algorithm to control the HVAC equipment. At the program set point change time, the information gathered during the recovery is used to update the ramp rate. Thermostat 70 ramps the set point from the setback set point to the setup set point using the ramp rate saved from the last recovery. Recovery is defined as starting when the ambient temperature crosses the ramp temperature and ending at the set point change time. During this time, the recovery is "active". If at anytime while recovery is "active" thermostat 70 turns off heat pump 80, a "cycle" flag is set. If at anytime while recovery is "active" thermostat 70 turns on the auxiliary heat, an "aux" flag is set. There is a "PWMMAX" (pulse width modulation signal at maximum) counter which is initialized to 0 at the start of recovery. Each minute during recovery, the value of pulse width signal 3 is checked and, if it is at maximum, the PWMMAX counter is incremented (to a limit of 15). At the end of recovery, if temperature is 1.5 degrees or more from reaching the desired temperature, a "late" flag is set. At the end of recovery, the ramp rate is updated once using one of the following conditions:

If the aux flag is set, the ramp rate is set 25 percent shallower.

If the late flag is set, the ramp rate is set 12.5 percent shallower.

If the cycle flag is set, the ramp rate is set 12 percent steeper.

If the PWMMAX counter is less than 15, the ramp rate is set 12.5 percent steeper.

Finally, if none of these conditions are met, the ramp rate remains the same.

By increasing or decreasing the ramp rate, it is possible to run the gas powered heat pump at a lower more efficient speed and further the gas powered heat pump is more easily able to maintain the exact set point, as requested by thermostat 70.

We claim:

1. A setback thermostat for a gas engine heat pump, and a method for controlling the gas engine heat pump, said thermostat providing a load signal to a gas engine heat pump controller, the gas engine heat pump controller increasing or decreasing the gas engine heat pump's operating level relative to said load signal, the thermostat ramping said temperature up when an increase in the setpoint occurs the method comprising the steps of:
   A. determining if a programmed setpoint change has occurred;
   B. when a programmed setpoint change has occurred monitoring the load signal;
   C. decreasing the ramp rate if auxiliary heat is turned on; and
   F. returning to step A.

2. The method of controlling a gas engine heat pump of claim 1 further comprising the steps of:
   D. increasing the ramp rate if said gas engine heat pump cycles.

3. The method of controlling a gas engine heat pump of claim 1 further comprising the steps of:
   E. decreasing the ramp rate if a final setpoint is not met by a predetermined time.

4. The method of controlling a gas engine heat pump of claim 2 further comprising the steps of:
   E. decreasing the ramp rate if a final setpoint is not met by a predetermined time.

* * * * *